(12) United States Patent
Hoffmann et al.

(10) Patent No.: US 11,737,453 B2
(45) Date of Patent: Aug. 29, 2023

(54) VACCINE CARRIER WITH A PASSIVE COOLING SYSTEM

(71) Applicant: B. MEDICAL SYSTEMS, S.a.r.l., Hosingen (LU)

(72) Inventors: Andreas Hoffmann, Ammeldingen (DE); Julien De Clercq, Hollange (LU); Eric Groenendaels, Fratin (BE)

(73) Assignee: B MEDICAL SYSTEMS S.A.R.L., Hosingen (LU)

( * ) Notice: Subject to any disclaimer, the term of this patent is extended or adjusted under 35 U.S.C. 154(b) by 772 days.

(21) Appl. No.: 16/488,624

(22) PCT Filed: Feb. 20, 2018

(86) PCT No.: PCT/EP2018/054082
§ 371 (c)(1),
(2) Date: Aug. 26, 2019

(87) PCT Pub. No.: WO2018/158104
PCT Pub. Date: Sep. 7, 2018

(65) Prior Publication Data
US 2020/0045959 A1 Feb. 13, 2020

(30) Foreign Application Priority Data
Feb. 28, 2017 (WO) ................ PCT/EP2017/054654

(51) Int. Cl.
*A01N 1/02* (2006.01)
*F25D 3/08* (2006.01)
*F25D 29/00* (2006.01)

(52) U.S. Cl.
CPC ............. *A01N 1/0273* (2013.01); *F25D 3/08* (2013.01); *F25D 29/005* (2013.01);
(Continued)

(58) Field of Classification Search
CPC .... F25D 3/08; F25D 29/005; F25D 2303/082; F25D 2303/0843; F25D 2600/06;
(Continued)

(56) References Cited

U.S. PATENT DOCUMENTS

| 5,435,142 A | * | 7/1995 | Silber | ................... F25D 3/08 |
| | | | | 62/457.2 |
| 5,934,099 A | * | 8/1999 | Cook | ................... A61J 1/165 |
| | | | | 62/457.2 |

(Continued)

FOREIGN PATENT DOCUMENTS

| EP | 1813247 A1 | | 8/2007 |
| KR | 2011000762 | * | 8/2011 |

(Continued)

OTHER PUBLICATIONS

Feb. 2018, First nt'l Search Report for PCT/EP2018/054082.
May 15, 2018, Second Int'l Search Report for PCT/EP2018/054082.
Jan. 21, 2019, Written Opinion for PCT/2018/054082.

*Primary Examiner* — Frantz F Jules
*Assistant Examiner* — Martha Tadesse
(74) *Attorney, Agent, or Firm* — Jerold I Schneider; Schneider IP Law

(57) ABSTRACT

A mobile vaccine carrier and method for operating the carrier. The carrier includes a housing having a lid preferably hinged to a base member, a vaccine storage member disposed within the housing and defining a storage space for a plurality of vaccine containers; and a cooling element disposed within the housing. The vaccine storage member further includes an inner container defining the storage space and having an inlet opening for placing and removing vaccine containers, a movable vaccine container holder and a cover member disposed on the lid. The vaccine container holder has an abutment portion abutting against an outer
(Continued)

portion of the inner container so that the inlet opening is covered by the vaccine container holder and at least a part of the cover member protrudes into the storage space when the lid is in a closed position.

20 Claims, 10 Drawing Sheets

(52) U.S. Cl.
CPC ................ *F25D 2303/0832* (2013.01); *F25D 2303/0844* (2013.01); *F25D 2700/12* (2013.01)

(58) Field of Classification Search
CPC ......... F25D 2700/12; F25D 2303/0844; F25D 2303/08221; A01N 1/0273; A61J 1/165
See application file for complete search history.

(56) References Cited

U.S. PATENT DOCUMENTS

| | | | | |
|---|---|---|---|---|
| 6,044,650 | A * | 4/2000 | Cook | F25D 3/08 |
| | | | | 62/130 |
| 2007/0028642 | A1 | 2/2007 | Glade | |
| 2007/0032774 | A1 * | 2/2007 | Glade | A61J 1/165 |
| | | | | 604/403 |
| 2007/0193297 | A1 * | 8/2007 | Wilson | F25D 29/00 |
| | | | | 62/457.2 |

FOREIGN PATENT DOCUMENTS

| | | | | |
|---|---|---|---|---|
| WO | WO-0241823 | A2 * | 5/2002 | ................ B01L 7/04 |
| WO | 2015042841 | A1 | 4/2015 | |

\* cited by examiner

VACCINE CARRIER WITH A PASSIVE COOLING SYSTEM

The present invention relates to a mobile vaccine carrier with a passive cooling system. Such systems are generally used to transport vaccines in remote areas from one place to another. Such mobile vaccine carriers in general comprise a housing having a lid hinged to a base member, so that the lid can be moved between a closed position and an open position, a vaccine storage member disposed within the housing defining a storage space for a plurality of vaccine containers, and at least one cooling element disposed within the housing. The cooling element is intended to cool the storage space on a passive basis.

Such mobile vaccine containers must guarantee a stable temperature over a certain period of time. The temperature must be kept stable within a certain temperature range so that the vaccine within the vaccine containers is not deteriorated. Such mobile vaccine carriers are not necessarily only to be used for transporting vaccine containers; other perishable medical products and goods could likewise be transported.

In general, the temperature range is a temperature range prescribed by the World Health Organization (WHO), commonly ranging between +0.5° C. and +10.0° C. when the container is used in an ambient temperature of at most +43.0° C. Freezing of the vaccine containers needs to be avoided; consequently, the temperature in the storage space must not drop below +0.5° C.

Furthermore, two types of mobile vaccine carriers can be distinguished depending on the duration of the cold life achievable, i.e. the duration until the temperature within the mobile vaccine carrier reaches +10.0° C. So-called short range carriers must maintain the desired temperature for at least 15 hours; so-called long range carriers must maintain the desired temperature for at least 30 hours.

As the mobile vaccine carriers are often used in remote places far away from a reliable electricity supply, the cooling is obtained by passive cooling systems. This means that the at least one cooling element (for example an ice pack, or phase change material containers) is pre-cooled and then placed into the mobile vaccine carrier to keep the temperature in the set range.

In addition to the temperature requirements, the WHO sets further requirements in terms of secure storage of the vaccine containers. A health worker carrying the mobile vaccine container frequently travels along rough terrain, where one might easy slip or fall. Hence, it has to be further ensured that the vaccine containers stored within the mobile vaccine carrier do not fall out or become damaged. In particular, this has also to be ensured for a situation in which the mobile vaccine carrier is dropped to the ground.

The above requirements that a mobile vaccine carrier has to fulfil are set out in the WHO publication PQS Independent type-testing protocol—Vaccine carrier, the content of which, in its version existing at the priority date of the present application, is incorporated herein by reference.

Accordingly, it is an object of the present invention to provide a mobile vaccine carrier having a passive cooling system which fulfils the above requirements, notably in terms of temperature range and safety of transport. In addition, it is an object of the present invention to provide a method for operating the mobile vaccine carrier.

The problem is solved by a mobile vaccine carrier according to claim 1 and a method for operating the mobile vaccine carrier according to claim 14. Preferred embodiments are described in the dependent claims.

The mobile vaccine carrier according to the present invention comprises an inner container defining the storage space and having an inlet opening for placing and removing vaccine containers, a removable vaccine container holder for temporarily storing vaccine containers, and a cover member disposed on the lid. The vaccine container holder has an abutment portion abutting against an outer portion of the inner container so that the inlet opening is covered by the vaccine container holder, and at least a part of the cover member protrudes or extends into the storage space when the lid is in the closed position.

Hence, the vaccine containers are not directly placed into the housing, but a separate inner container is provided which defines the storage space. The vaccine containers can be placed in the storage space or removed therefrom via the inlet opening. In operation, the inlet opening is covered by the vaccine container holder and at least a part of the cover member protrudes into the storage space when the lid is in the closed position. Based on this arrangement, direct contact between the vaccine containers and the at least one cooling element is prevented so that the vaccine with the vaccine containers is not subject to the risk of deterioration by freezing. In addition, this greatly avoids the risk that the vaccine containers stored within the storage space could fall out when the mobile vaccine carrier is, for example, inadvertently dropped. Furthermore, the above provides a perfect air exchange and hence, maintaining of the temperature in the housing within the desired range for at least the 15 hours required for a short-range carrier.

Preferably, the vaccine carrier further comprises a measuring device for monitoring the temperature within the storage space. The measuring device has a sensor arrangement comprising a temperature sensor for monitoring the temperature in the storage space. Preferably, the sensor arrangement is supported on the cover member, and the temperature sensor is disposed within the vaccine storage member when the lid is in the closed position. Thus, the temperature prevailing in the vaccine storage member can easily be monitored. In addition, the temperature sensor does not need to be positioned manually but is in the correct position when the lid is in the closed position.

Preferably, the vaccine container holder has a central opening, wherein the temperature sensor is disposed within the central opening when the lid is in the closed position. This allows for a precise measurement of the temperature within the vaccine storage member.

Preferably, the cover member comprises an elongated member with the temperature sensor being supported on an end portion of the elongated member. Preferably, the elongated member protrudes from the cover member in a direction virtually parallel to the axial extension of the vaccine storage member or inner container respectively. Thus, the temperature sensor reaches into the vaccine storage member sufficiently, so that the temperature measurement is reliable. In addition, the elongated member is preferably integrally formed with the cover member.

Preferably, the lid comprises a cooling element storage recess for supporting the at least one cooling element therein, wherein the cover member is articulated to an inner portion of the lid, so that moving the cover member from a first position to a second position allows insertion or removal of the at least one cooling element to or from the cooling element storage recess. Thus, the at least one cooling element is separated from the vaccine storage member and is provided within the lid. This allows for an ideal temperature distribution, as exchange of cold air is improved.

Preferably, the lid comprises a locking device which locks the cover member in the first position. This further supports the cooling element provided in the cooling element storage recess in position and further allows the articulated cover member to be safely secured during transportation of vaccine containers.

Alternatively, the lid may comprise a locking device and a cooling element storage recess for supporting the at least one cooling element therein, wherein the locking device locks the cooling element in the cooling element storage recess. Thus, the same advantages as mentioned above in terms of the cover member to be locked may be achieved, but without the need to have the cover member articulated to the lid.

Preferably, the locking device comprises a latch part fixed to the lid and a hook part articulated to the lid, wherein the hook part is securable to the latch part. The hook part can be configured to be moved together with the cover member or separately of the cover member.

Preferably, the hook part comprises at least one flexible retaining arm, the retaining arm being configured to be manually moveable from an engagement position to a release position, wherein the hook part is only disengageable from the latch part when the retaining arm is in the release position. Thus, manually displacing the retaining arm allows release of the hook part from the latch part, and hence, one may remove the cooling element which is provided in the cooling element storage recess. Preferably, engaging the hook part to the latch part also necessitates that the retaining arm be manually displaced. However, it is also possible that the retaining arm is moveable from the engagement position to the release position by sliding along a cam surface provided on the latch part.

Preferably, the vaccine container holder comprises a flexible insert defining at least one support portion, the support portion being configured to receive a vaccine container via a force fit. Preferably, the flexible insert defines a plurality of support portions. Thus, open vaccine containers used during e.g. an immunization campaign can be temporarily stored within the vaccine container holder. Tilting of the open vaccine containers is greatly inhibited due to the force fit between the vaccine containers and the support portions of the flexible insert. For stable retention of the vaccine containers, it is preferable that the vaccine container holder comprises respective support cuts.

Preferably, the vaccine storage member is supported within the base member, and the base member comprises at least one receptacle for the at least one cooling element. In this connection, it is also preferable that the base member comprises at least two receptacles for receiving at least two cooling elements alternatively or in addition to the cooling element provided in the cooling element storage recess. Thus, this ensures a stable temperature range and sufficient cooling of the vaccine containers for a long period of time.

Preferably, the measuring device comprises a display, wherein the temperature sensor is connected to the display for visualizing the measured temperature. Preferably, the display is provided on the exterior of the housing, so that one can easily see an indication of the temperature prevailing within the mobile vaccine carrier.

Preferably, the measuring device comprises a photovoltaic cell for power supply. Thus, temperature measurement is also possible in remote areas and one may rely on digital measurement methods which need a minimal amount of electrical energy. It is further conceivable that the measuring device comprises a rechargeable battery so that reliable temperature measurement is also possible for example during night time or shaded periods.

Preferably, the base member comprises a first stacking portion and the lid comprises a second stacking portion, wherein the first stacking portion is configured to engage the second stacking portion of a second vaccine carrier so that a plurality of vaccine carriers can be stacked. Thus, several mobile vaccine carriers can be securely stored by being stacked. Further, it is preferable that the mobile vaccine container comprises attachment portions to attach a carrier, e.g. a shoulder strap or back pack straps. This allows for convenient handling of the mobile vaccine carrier.

Furthermore, the invention is directed to a method for operating a mobile vaccine carrier as described above. The method comprises the following steps for an ambient air temperature of +32.0° C. or more: completely freeze the at least one cooling element; insert the completely frozen cooling element into the housing; move the lid into the closed position; leave the lid closed for 60 minutes; move the lid into open position; place vaccine containers into the storage space of the inner container; insert vaccine container holder so that inlet opening is covered; and move the lid into the closed position. For an ambient air temperature of about +10.0° C. to about +32.0° C., the method comprises the following steps: completely freeze the at least one cooling element; thaw cooling element for about 60 minutes when the ambient temperature is about +10.0° C. and for about 15 minutes when the ambient temperature is about +32.0° C.: insert cooling element into the housing; move the lid into the closed position; leave the lid closed for 15 minutes when the ambient temperature is about +10.0° C. and for about 60 minutes when the ambient temperature is about +32.0° C.; move the lid into open position; place vaccine containers into the storage space of the inner container; insert vaccine container holder so that inlet opening is covered; and move the lid into the closed position.

Following the above method ensures that the temperature within the mobile vaccine carrier does not exceed +10.0° C. for a sufficiently long period of time to allow a safe transportation of vaccine containers.

The invention will now be described in more detail, by way of example only, with reference to an embodiment shown in the Figures, wherein.

Figure 1:
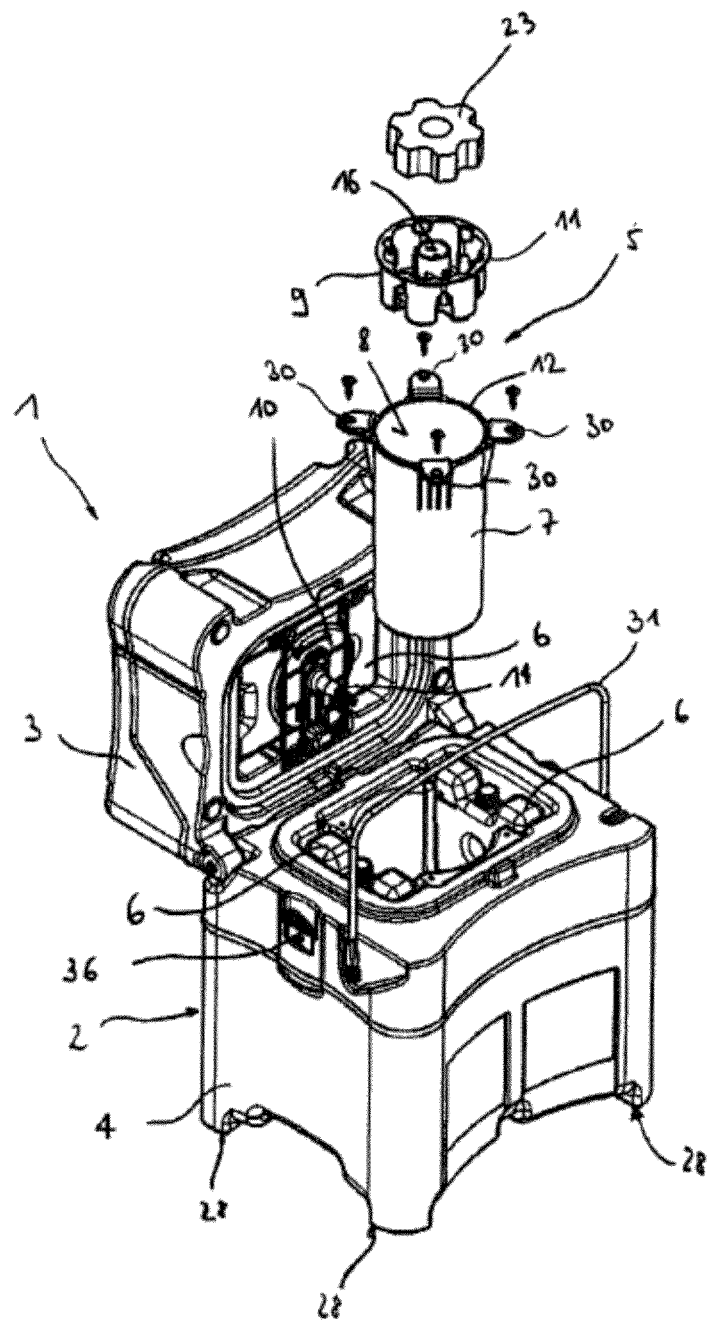
FIG. 1 is a perspective and partly exploded view of the inventive mobile vaccine carrier.
Figure 2:
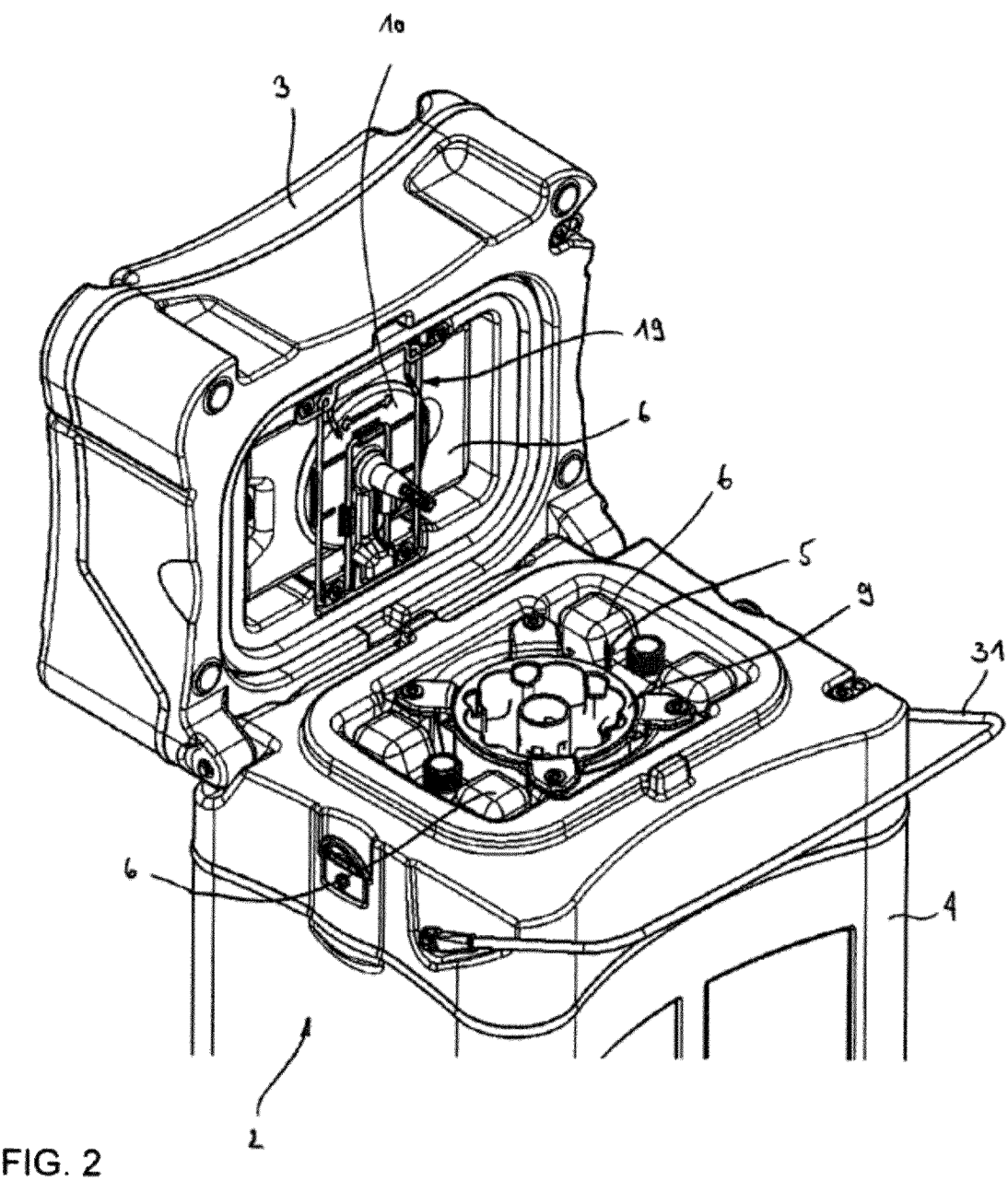
FIG. 2 is a detailed perspective view of the lid in the open position.
Figure 10:
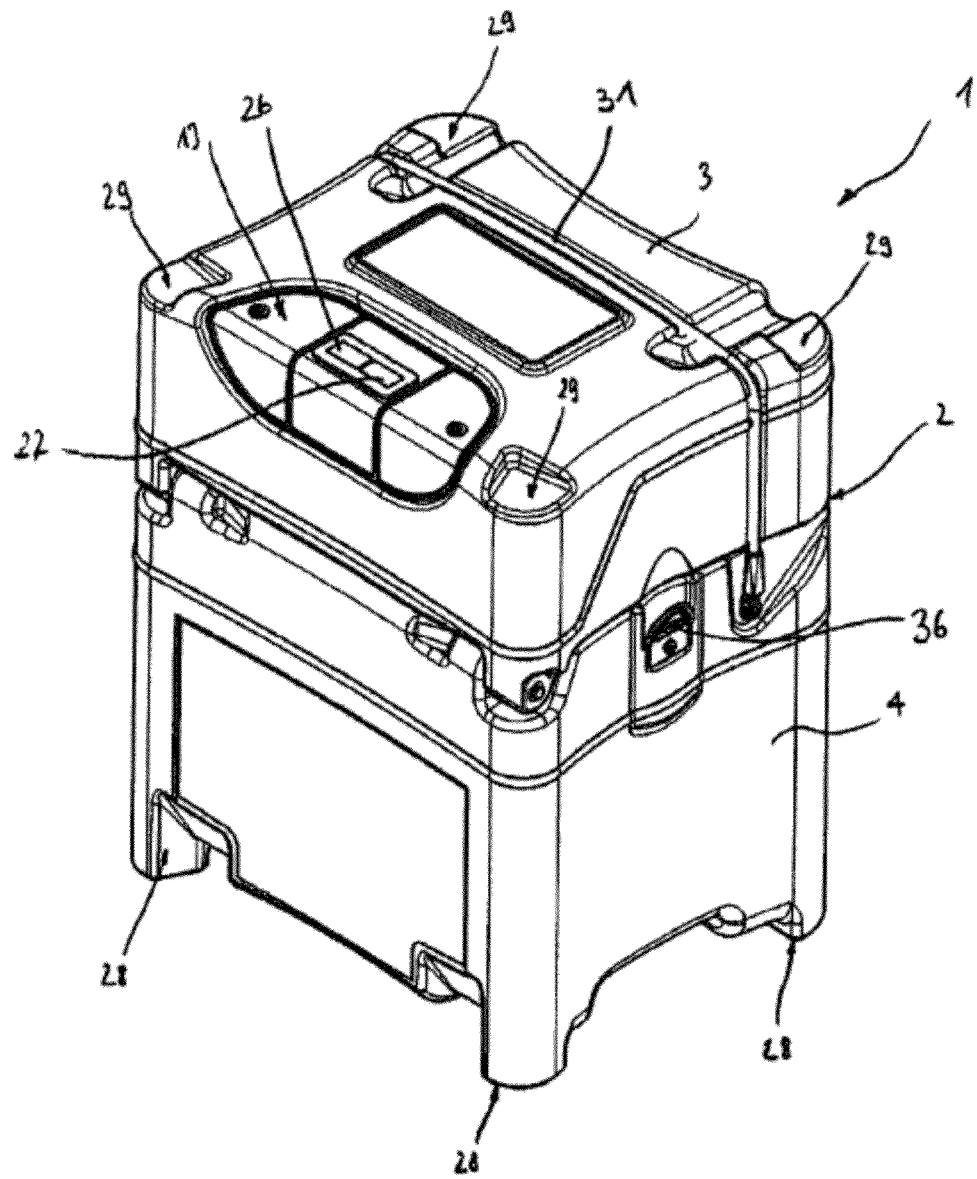
FIG. 10 is a perspective view of the mobile vaccine container with the lid in the closed position.
Figure 11:
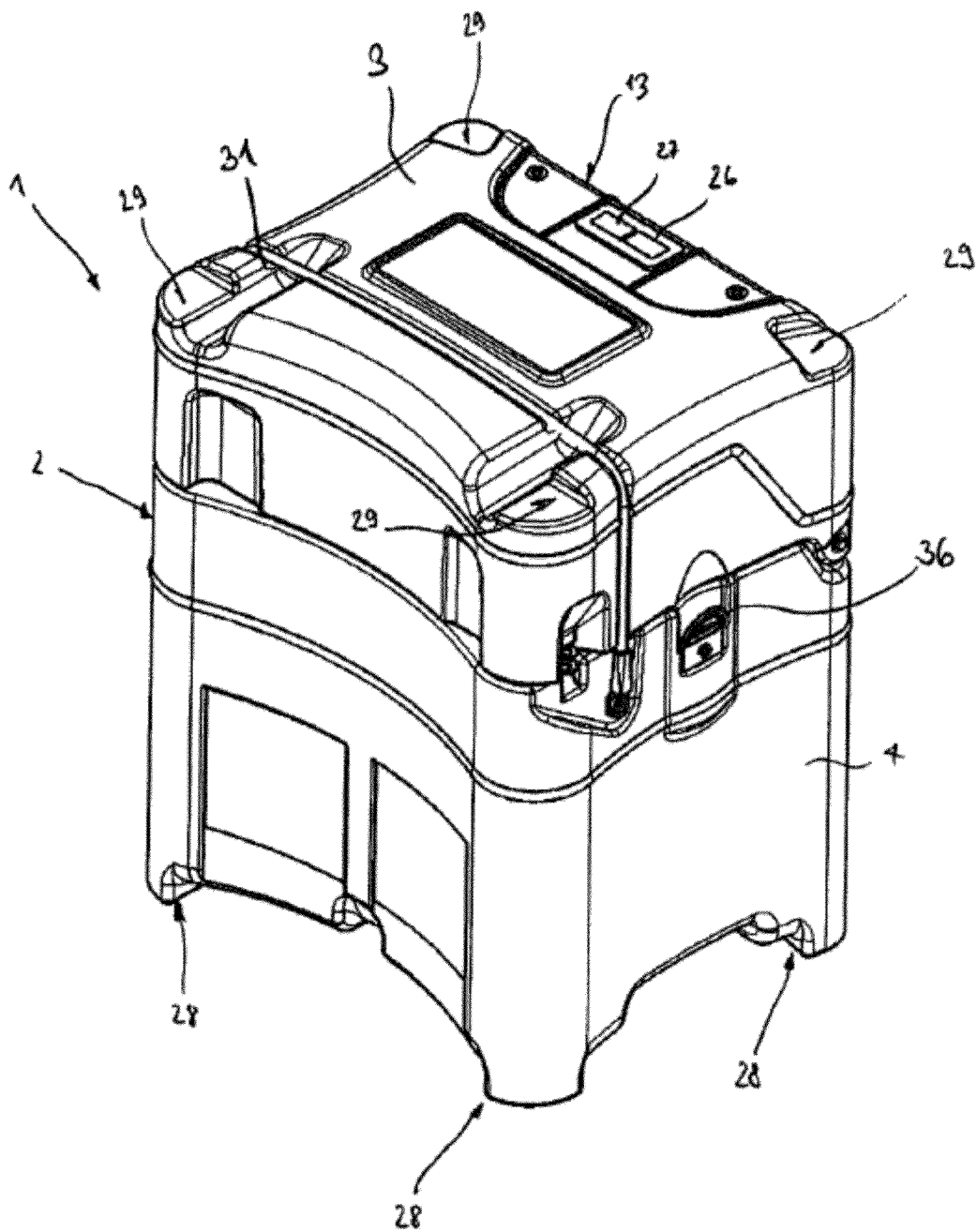
FIG. 11 is another perspective view of the mobile vaccine container with the lid in the closed position.

FIG. 1 shows a perspective and partly exploded view of the mobile vaccine carrier 1 according to the present invention. The vaccine carrier 1 comprises a housing 2 composed of a lid 3 and a base member 4. As can be seen in FIG. 1, the lid 3 is hinged to the base member 4 so that it can be moved between an open position (cf. FIGS. 1, 2 and 4 to 6) and a closed position (cf. FIGS. 10 and 11). As can be seen in the Figures, the base member 4 comprises a strap 31 which can be fixed to a notch of the lid 3 to keep the lid 3 secured in the closed position. In particular, the strap 31 can be an elastic member so that it can easily be attached to the notch of the lid 3. Thus, the lid 3 can be opened by a user with just one hand while the user's other hand is free to handle the vaccines. Furthermore, the front shape of the base member 4 is curved, such that the vaccine carrier 1 can comfortably lie against the hip of a user when the vaccine carrier 1 is used with shoulder straps.

Figure 12:
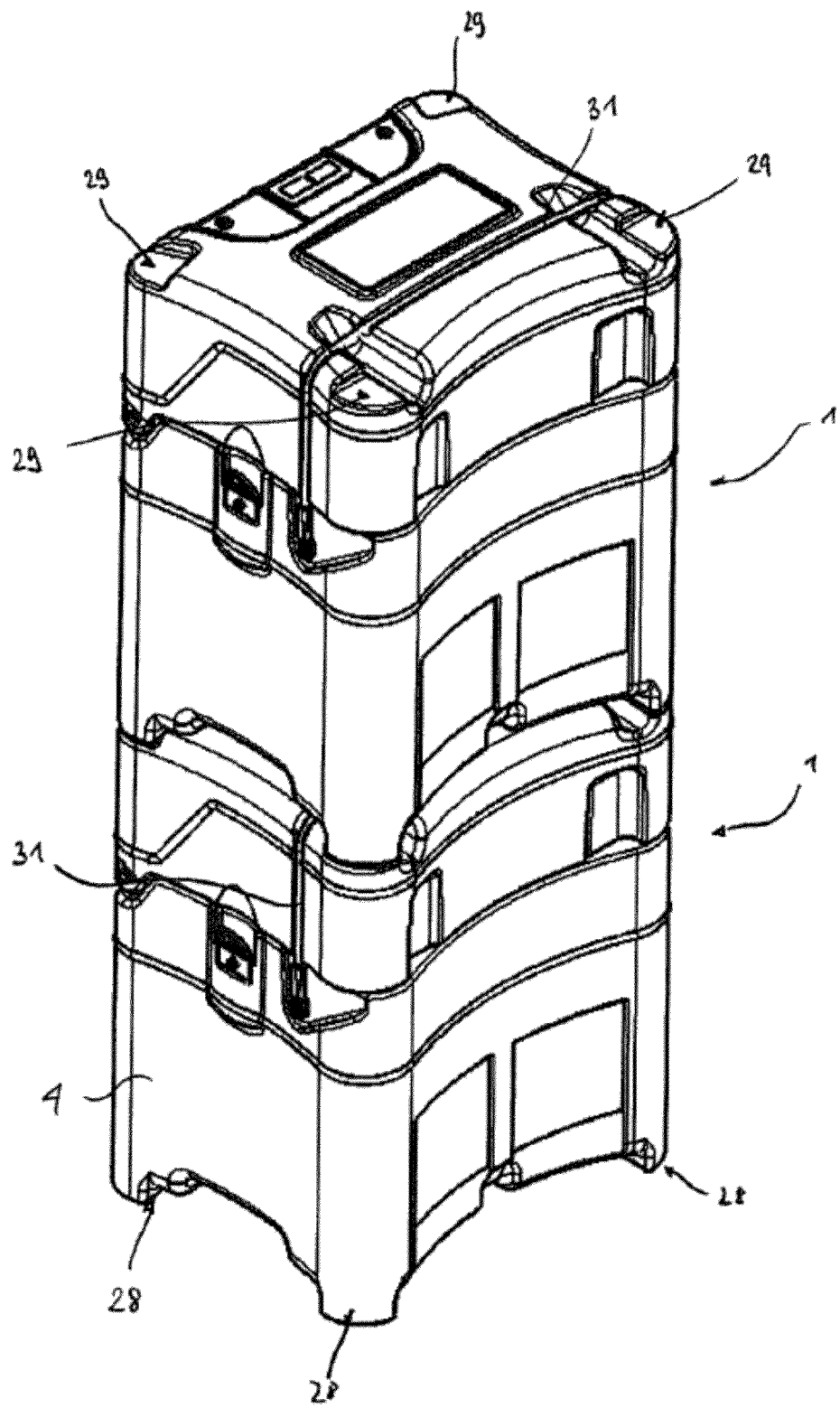
FIG. 12 is a perspective view of two mobile vaccine containers being stacked.

Furthermore, there are attachments 36 provided on the housing 2 to attach a shoulder strap or the like to the vaccine carrier 1. As shown in e.g. FIG. 1, the attachments 36 can be provided on the side surfaces of the base member 4 in the form of e.g. a hook. The base member 4 further comprises four first stacking portions 28 in the form of legs and the lid 3 comprises four second stacking portions 29 in the form of recesses. As can be seen in FIG. 12, the first stacking portions 28 can engage the second stacking portions 29 of a second mobile vaccine carrier 1 so that a plurality of mobile vaccine carriers 1 can be safely stacked.

The vaccine carrier 1 further comprises a vaccine storage member 5 which is shown in detail in the exploded view according to FIG. 1. The vaccine storage member 5 has an inner container 7 with an inlet opening 8, a removable vaccine container holder 9 and a flexible insert 23. The latter will be described in more detail below. The vaccine container holder 9 has a central opening 16 which is substantially concentric with the main axis of the inner container 7.

Figure 4:
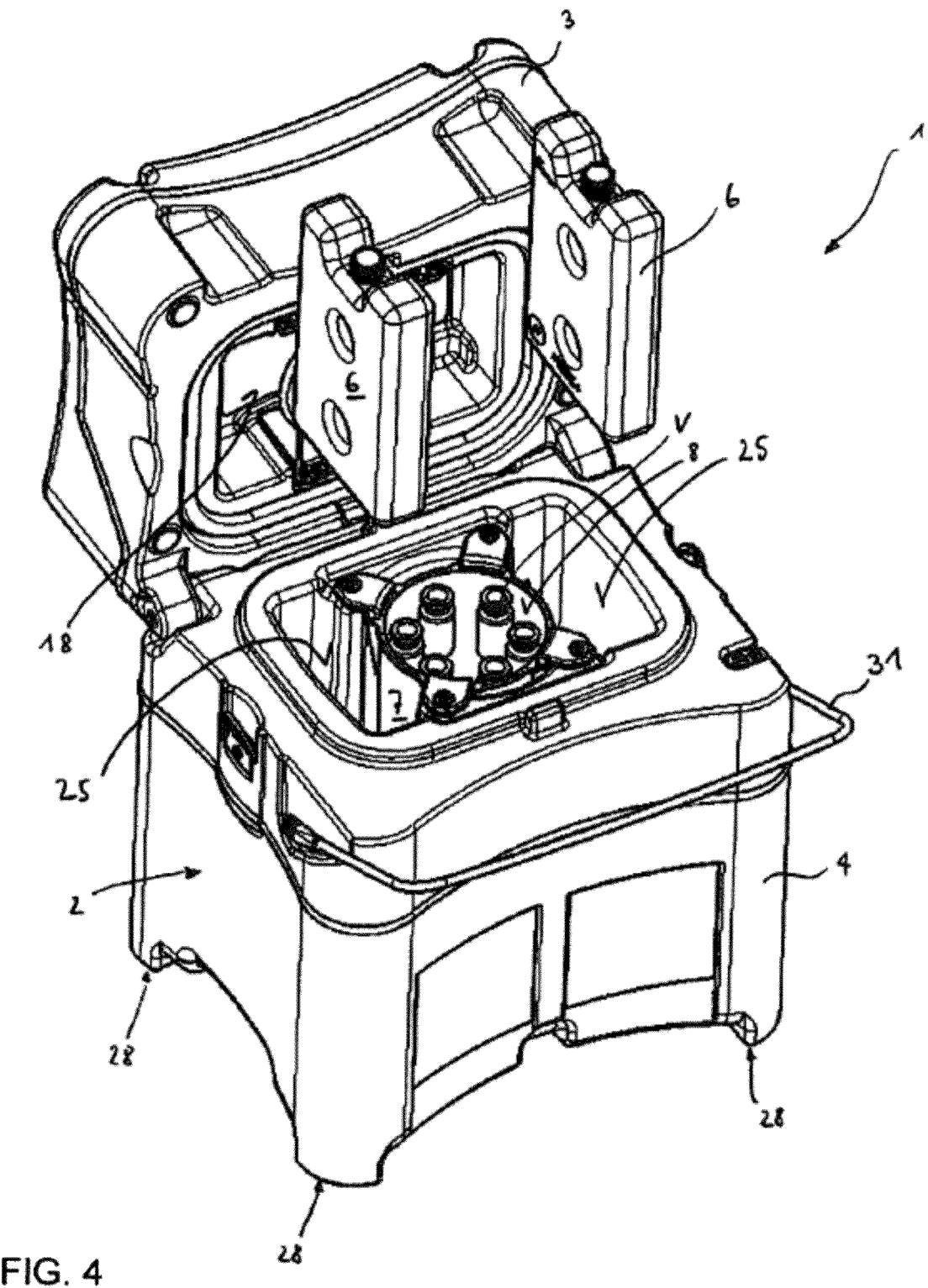
FIG. 4 is a perspective view of the mobile vaccine carrier with the cooling elements to be inserted into the receptacles.

The inner container 7 defines a storage space for storing vaccine containers V, as shown e.g. in FIG. 4. The vaccine containers V are placed into the storage space or are taken out of the storage space via the inlet opening 8. As can be seen in FIG. 1, the inner container 7 is of virtually cylindrical shape. A plurality of ears 30 extent in the radial direction from the top portion or outer portion 12 of the inner container 7. The ears 30 are provided with through holes so that the inner container 7 can be fixed to the base member 4 via screws. The container holder 9 is also of virtually cylindrical shape, so that it can be inserted into the inner container 7 via the inlet opening 8. The container holder 9 has an abutment portion 11 extending circumferentially which acts as a stopper so that the container holder 9 covers the inlet opening 8 when installed to the inner container 7, cf. FIG. 2. Alternatively, the inner container 7 and the container holder 9 may be of a rectangular shape or any other suitable shape.

As shown in FIG. 4, the base member 4 comprises two receptacles 25 each of which can receive a cooling element 6 therein. The receptacles 25 are designed so that the cooling elements 6 are retained without being in direct contact with the inner container 7, as can be seen e.g. in FIG. 2.

Figure 3:
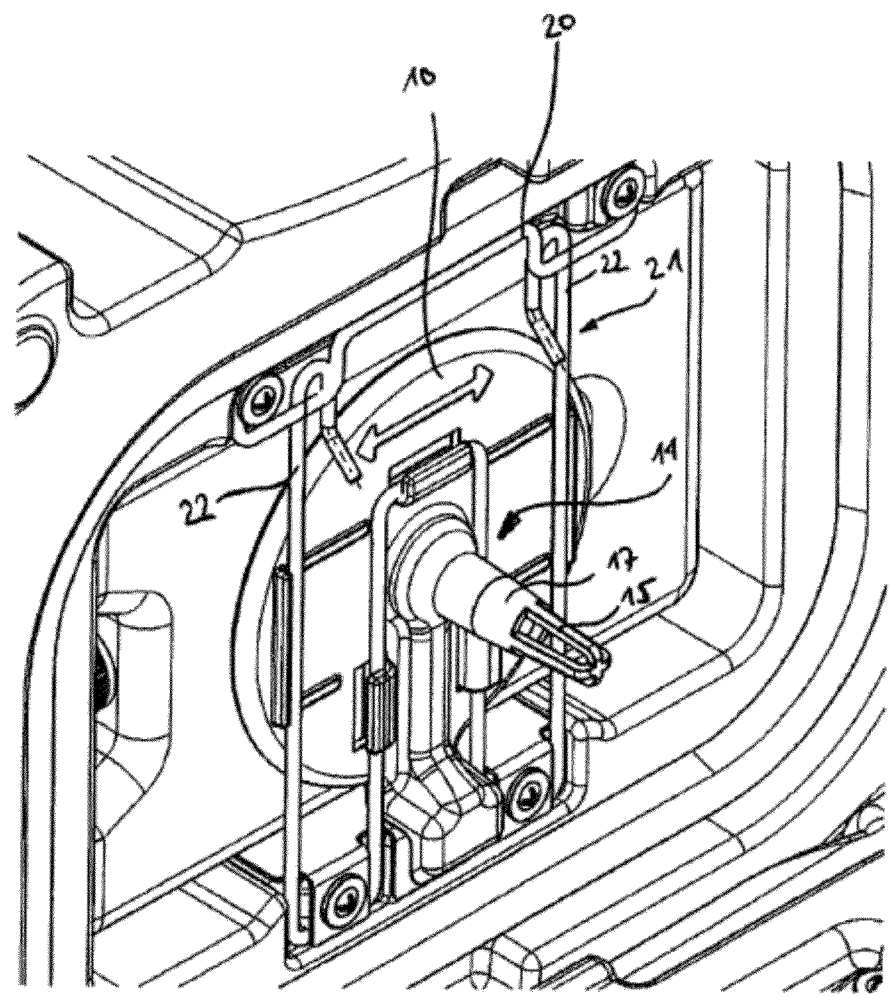
FIG. 3 is a detailed view of the cover member and locking device.
Figure 5:
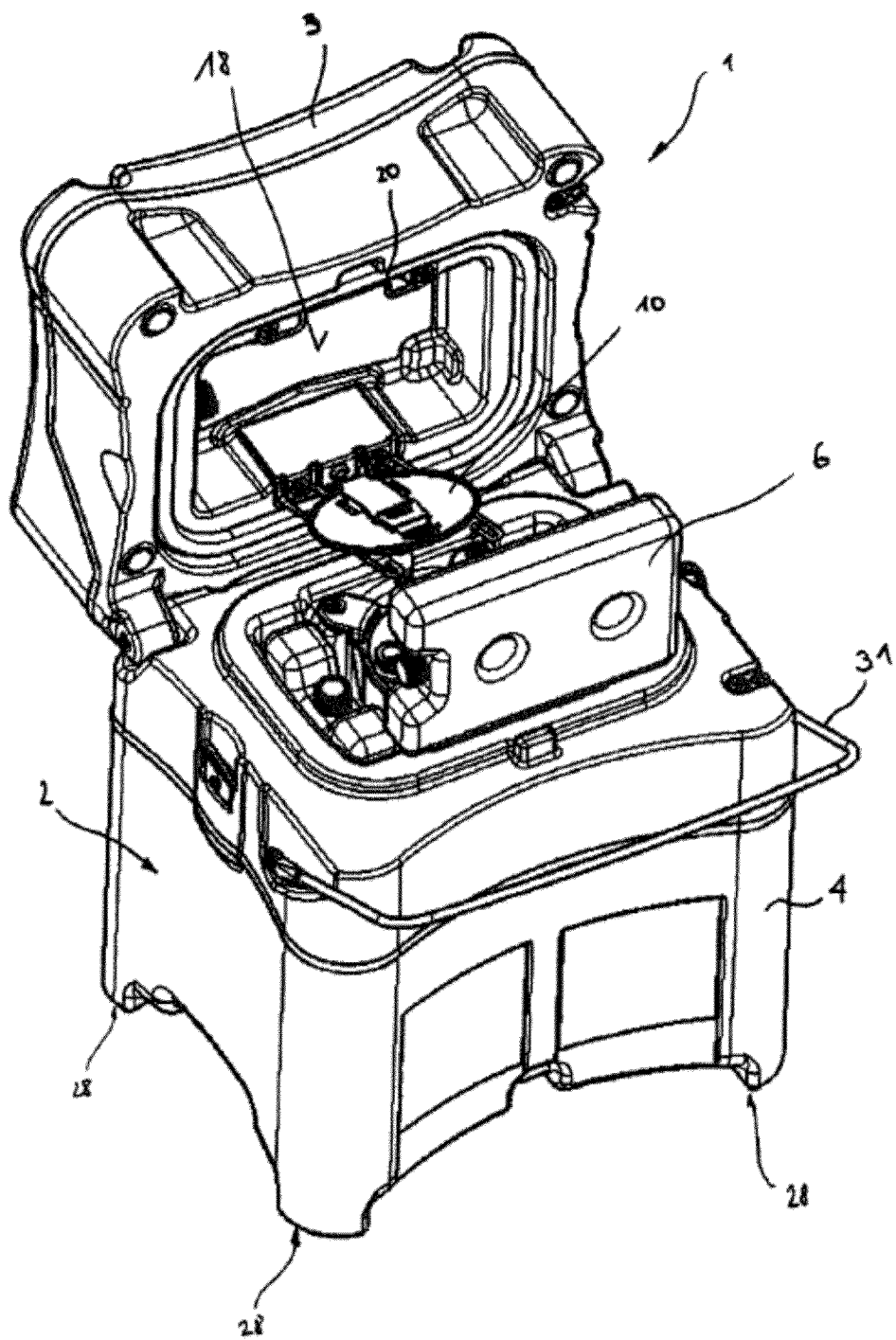
FIG. 5 is a perspective view of the mobile vaccine carrier with the cooling element to be inserted into the cooling element storage recess.
Figure 6:
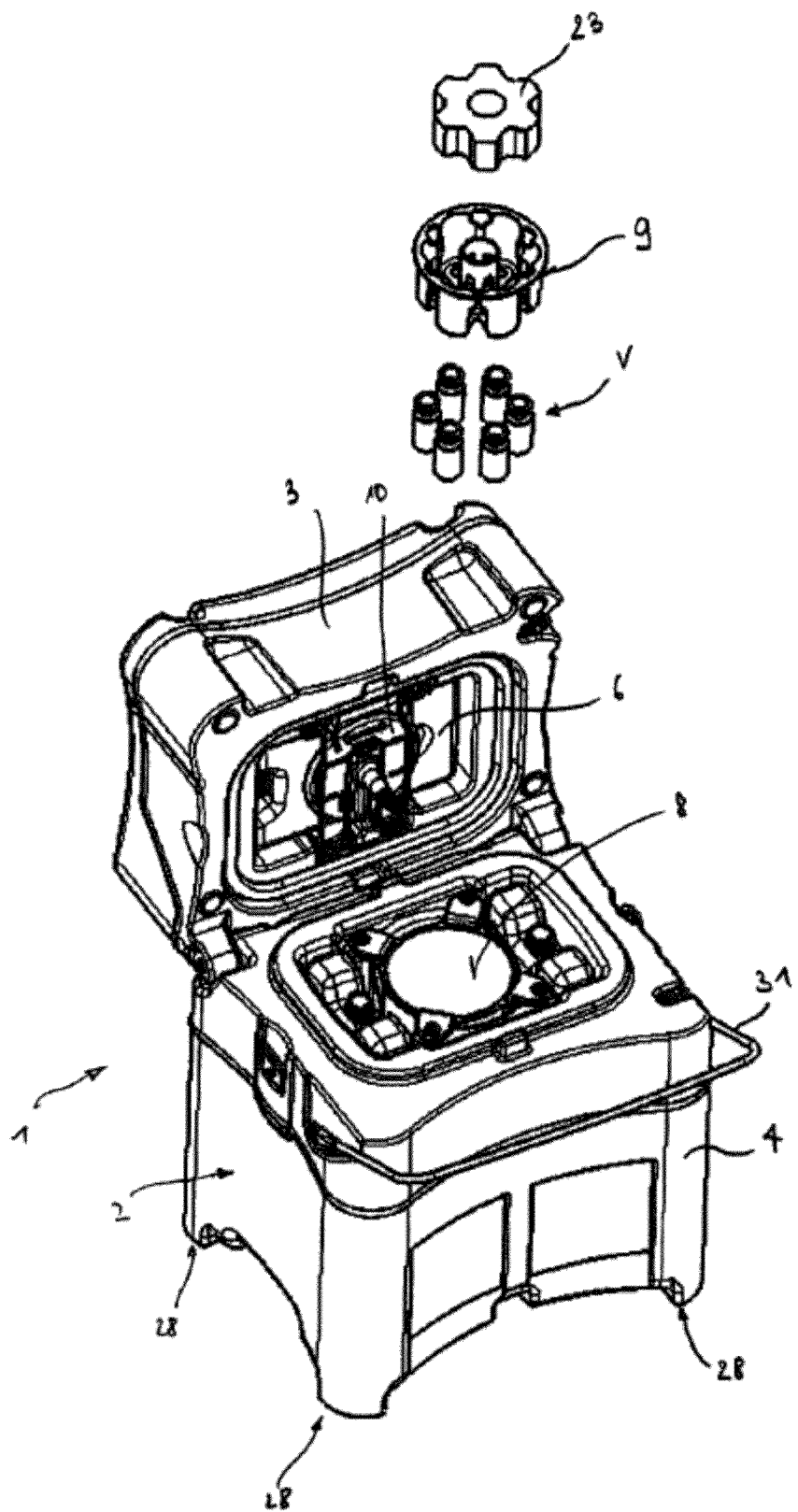
FIG. 6 is a perspective and partly exploded view of the inventive mobile vaccine carrier showing vaccine containers to be inserted into the storage space.

FIG. 3 is a detailed view of the inner portion of the lid 3, i.e. that portion of the lid 3 that faces the inner container 7 when the lid 3 is in the closed position. As shown, a cover member 10 is disposed on the inner portion of the lid 3. In particular, the cover member 10 is articulated to the inner portion of the lid 3 so that it can be moved between a first position (cf. FIG. 3) and a second position (cf. FIG. 5). When the cover member 10 is in the second position, as shown in FIG. 5, one can access a cooling element storage recess 18 provided in the lid 3. The cooling element storage recess 18 is configured to support a cooling element 6 therein. The cooling element 6 is identical to the cooling elements 6 which can be supported in the receptacles 25 of the base member 4 as described above.

To avoid unintended movement of the cover member 10 from the first position to the second position, the lid further comprises locking device 19 consisting of a latch part 20 fixed to the lid 3 and a hook part 21 articulated to the lid 3. The cover member 10 is attached to the hook part 21 so that it is articulated together with the hook part 21. The hook part 21 comprises two retaining arms 22 which can be moved manually from the shown engagement position (cf. FIG. 5) to a release position. To do so, each of the retaining arms 22 is moved towards the other one of the retaining arms 22 so that the top portions of the retaining arms 22 are disengaged from the latch member 20. Then, the hook part 21 can be moved relative to the latch member 20. The hook part 21 is preferably composed of an elastic material (e.g. spring steel) so that the retaining arms 22 automatically return to the engagement position when they are released.

In addition, the mobile vaccine carrier 1 comprises a measuring device 13. The measuring device 13 has a sensor arrangement 14 comprises a temperature sensor 15. As shown e.g. in FIG. 7, an elongated member 17 is integrally formed with the cover member 10. The temperature sensor 15 is supported on an end portion of the elongated member 17, cf. e.g. FIG. 3. When the lid 3 is in the closed position, the elongated member 17 as a part of the cover member 10 protrudes or extends into the storage space. In particular, the elongated member 17 extends into the central opening 16 of the vaccine container holder 9 so that the temperature sensor 15 reaches into the storage space. This allows reliable and precise temperature measurement.

Figure 7:
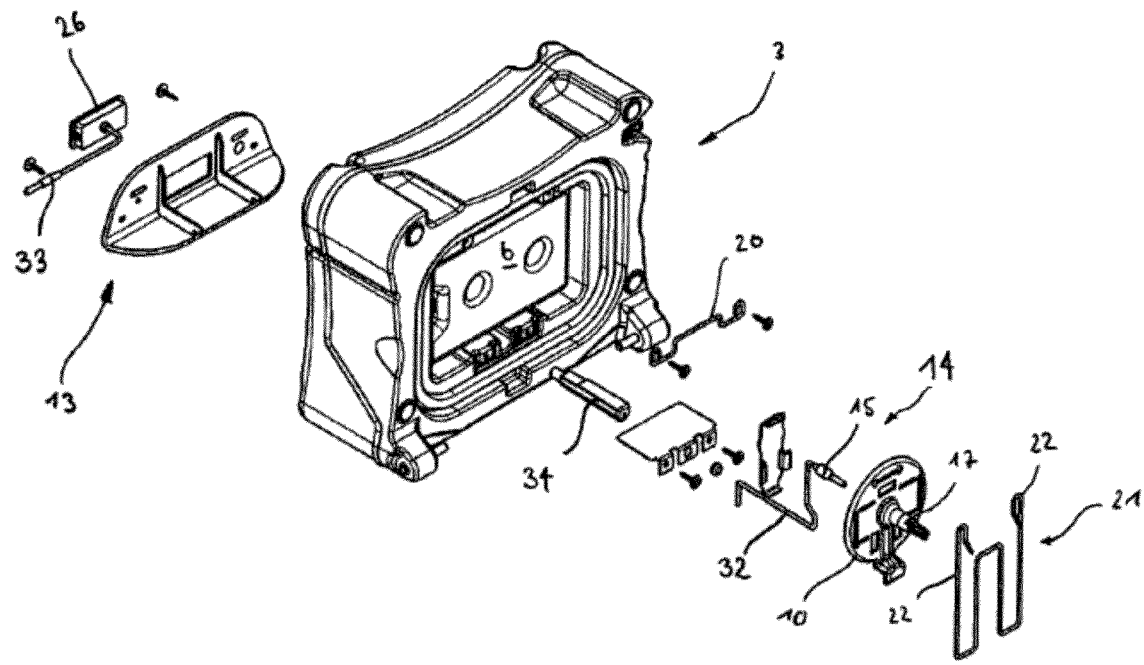
FIG. 7 is an exploded view of the lid.

The measuring device 13 further comprises a display 26 and a photovoltaic cell 27 to deliver energy. Although not shown, the photovoltaic cell 27 can be connected to a rechargeable battery so that energy can also be delivered e.g. during night time. As shown in FIG. 7, the sensor arrangement 14 further comprises a sensor connecting cable 32 attached to the temperature sensor 15 which can be connected to a display connecting cable 33 of the display 26 so that signals and/or power can be transferred between the display 26 and the temperature sensor 15. For thermal isolation purposes a bushing 34 is provided which is fitted to the respective opening reaching through the lid 3, cf. FIG. 7. The temperature measured by the temperature sensor 15 is displayed via the display 26. For comfortable handling, the display 26 is attached to an outside of the housing 2. In particular, the display 26 is attached to the lid 3 so that the measured temperature can easily be seen. Preferably, the photovoltaic cell 27 is also attached on top of the lid 3 next to the display 26. This allows optimal solar radiation on the photovoltaic cell 27.

Figure 8:
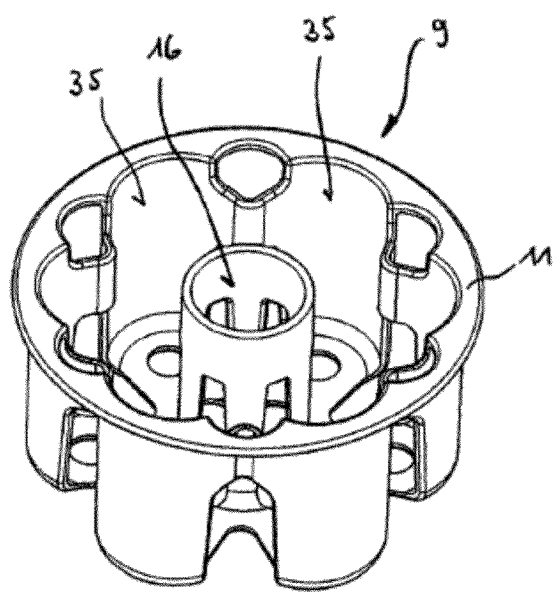
FIG. 8 is an enlarged view of the vaccine container holder.
Figure 9:
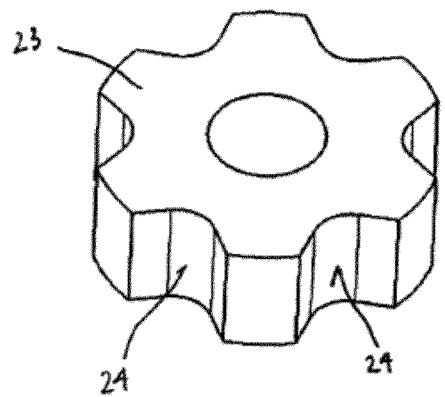
FIG. 9 is an enlarged view of the flexible insert.

As mentioned above, a flexible insert 23 can be provided with the vaccine container holder 9. The flexible insert 23 fits into the vaccine container holder 9 and defines support portions 24. The vaccine container holder 9 may have respective support cuts 35 as shown in FIG. 8. Thus, vaccine containers V can be inserted into the space formed between support portions 24 and the support cuts 23. As the flexible insert 23 is composed of flexible material, the vaccine containers V are held in place by a force fit, as the flexible insert 23 is slightly compressed by the vaccine container V inserted. Vaccine containers V should only be stored temporarily in the vaccine container holder 9, e.g. during an immunization campaign as it cannot be guaranteed that the (open) vaccine containers V are sufficiently cooled to avoid deterioration of the vaccine.

Next, operation of the mobile vaccine carrier 1 will be described. First, all three cooling elements 6 are completely frozen to a temperature of about −20.0° C. Depending on the ambient air temperature in which the mobile vaccine carrier is to be use, the cooling elements 6 are directly placed into the housing 2 or are thawed to some degree.

In particular, if the ambient air temperature is about +32.0° C. or more, two of the unthawed cooling elements 6 are placed into the receptacles 25 of the base member 4, as shown in FIG. 4. In addition, the hook part 21 is disenganged from the latch part 20 as described above and the cover member is articulated into the second position. Thus, the third unthawed cooling element 6 can be placed into the cooling element storage recess 18 of the lid 3 as shown in FIG. 5.

If the ambient air temperature is between about +10.0° C. and +32.0° C. all three cooling elements 6 are thawed prior to inserting them into the housing. The thawing time is between about 60 minutes (for an ambient air temperature of about +10.0° C.) and about 15 minutes (for an ambient air temperature of about +32.0° C.). After thawing, all three cooling elements 6 are placed into the housing 2 as described above.

After placing the cooling elements 6 into the housing 2, the cover member 10 is moved in the first position again and the hook part 21 is engaged to the latch part 20 by first moving the retaining arms 22 manually into the release position. Then the lid 3 is moved into the closed position. If the ambient air temperature is about +32.0° C. or more, the lid 3 stays in the closed position for about 60 minutes to allow the storage space to pre-cool. If the ambient air temperature is between about +10.0° C. and about +32.0° C. the lid 3 stays in the closed position for about 15 minutes when the ambient temperature is about +10.0° C. and for about 60 minutes when the ambient temperature is about +32.0° C. to allow the storage space to pre-cool.

After pre-cooling the storage space, the lid 3 is moved into the open position and vaccine containers V can be placed into the storage space of the inner container 7. The vaccine container holder 9 is then inserted into the inner container 7 so that the inlet opening 8 is covered. Then, the lid 3 is closed and fixed in the closed position by attaching the strap 31 to the notch of the lid 3. The mobile vaccine container 1 is now ready for use and to transport vaccine containers V to remote places. It is not necessary to insert the flexible insert 23.

LIST OF REFERENCE SIGNS 1 mobile vaccine carrier
2 housing
3 lid
4 base member
5 vaccine storage member
6 cooling element
7 inner container
8 inlet opening
9 vaccine container holder
10 cover member
11 abutment portion
12 outer portion
13 measuring device
14 sensor arrangement
15 temperature sensor
16 central opening
17 elongated member
18 cooling element storage recess
19 locking device
20 latch part
21 hook part
22 retaining arm
23 flexible insert
24 support portion
25 receptacle
26 display
27 photovoltaic cell
28 first stacking portions
29 second stacking portions
30 ear
31 strap
32 sensor connecting cable
33 display connecting cable
34 bushing
35 support cut
36 attachments
V vaccine container

The invention claimed is:

1. A mobile vaccine carrier with a passive cooling system comprising: a housing having a base member and a lid, the lid being hinged to the base member so that the lid is movable by rotation between a closed position and an open position; a vaccine storage member disposed within the housing and defining a storage space for a plurality of vaccine containers; and at least one cooling element disposed within the housing; the vaccine storage member further comprising; an inner container defining the storage space and having an inlet opening for placing and removing the plurality of vaccine containers; a removable vaccine container holder for temporarily storing the plurality of vaccine containers; and a cover member disposed on the lid, the cover member being secured to the lid so that the cover member moves with the lid when the lid is moved by rotation between the closed position and the open position; wherein the vaccine container holder comprises an abutment portion abutting against an outer portion of the inner container so that the inlet opening is covered by the vaccine container holder;
    wherein at least a part of the cover member protrudes into the storage space when the lid is in the closed position;
    wherein the vaccine carrier further comprises a measuring device for monitoring a temperature within the storage space;
    wherein the measuring device has a sensor arrangement comprising a temperature sensor for monitoring the temperature in the storage space;
    wherein the sensor arrangement is supported on the cover member;
    wherein the cover member comprises an elongated member with the temperature sensor being supported on an end portion of the elongated member;
    and wherein the sensor arrangement moves with the cover member when the cover member moves with the lid between the closed position and the open position so that the temperature sensor is disposed within the vaccine storage member when the lid is in the closed position and the temperature sensor being removed from within the vaccine storage member when the lid is in the open position.

2. The vaccine carrier of claim 1, wherein the vaccine container holder has a central opening, and wherein the temperature sensor is disposed within the central opening when the lid is in the closed position.

3. The vaccine carrier of claim 1, wherein the elongated member is integrally formed with the cover member.

4. The vaccine carrier of claim 1 comprising at least one of the following features (a) through (d);
   (a) wherein the lid comprises a cooling element storage recess for supporting the at least one cooling element therein, wherein the cover member is articulated to an inner portion of the lid so that moving the cover member from a first position to a second position allows insertion or removal of the at least one cooling element to or from the cooling element storage recess;
   (b) wherein the lid comprises a cooling element storage recess for supporting the at least one cooling element therein, wherein the cover member is articulated to an inner portion of the lid so that moving the cover member from a first position to a second position allows insertion or removal of the at least one cooling element to or from the cooling element storage recess and wherein the lid comprises a locking device which locks the cover member in the first position;
   (c) wherein the lid comprises a locking device and a cooling element storage recess for supporting the at least one cooling element therein, wherein the locking device locks the cooling element in the cooling element storage recess;
   (d) wherein the lid comprises a locking device and a cooling element storage recess for supporting the at least one cooling element therein, wherein the locking device locks the cooling element in the cooling element storage recess, wherein the locking device comprises a latch part being fixed to the lid and a hook part being articulated to the lid, wherein the hook part is securable to the latch part, wherein the hook part comprises at least one flexible retaining arm, the retaining arm being configured to be manually moveable from an engagement position to a release position, wherein the hook part is only disengageable from the latch part when the retaining arm is in the release position.

5. The vaccine carrier of claim 1, wherein the vaccine container holder comprises a flexible insert defining at least one support portion, the support portion being configured to receive the plurality of vaccine containers via a force fit.

6. The vaccine carrier of claim 1, wherein the vaccine storage member is supported within the base member, and wherein the base member comprises at least one receptacle for the at least one cooling element.

7. The vaccine carrier of claim 1 comprising at least one of the following features (a) and (b):
   (a) wherein the measuring device comprises a display, wherein the temperature sensor is connected to the display for visualizing the measured temperature;
   (b) wherein the measuring device comprises a photovoltaic cell for power supply.

8. The vaccine carrier of claim 1, wherein:
   the base member comprises first stacking portions and the lid comprises second stacking portions,
   wherein the first stacking portions are configured to engage second stacking portions of a second vaccine carrier so that a plurality of vaccine carriers can be stacked.

9. Method for operating the vaccine carrier of claim 1, selected from (a) or (b):
   (a) for an ambient temperature of at least +32° C.: completely freezing the at least one cooling element; inserting the completely frozen cooling element into the housing;
   moving the lid into the closed position; leaving the lid closed for at least 60 minutes;
   moving the lid into the open position; placing the plurality of vaccine containers into the storage space of the inner container; inserting the vaccine container holder so that the inlet opening is covered; and moving the lid into the closed position; (b) for an ambient temperature of +10° C. to less than +32° C.: completely freezing the at least one cooling element; thaw cooling the cooling element for between 60 minutes when the ambient temperature is +10° C. and 15 minutes when the ambient temperature is +32° C.; inserting the cooling element into the housing; moving the lid into the closed position; leaving the lid closed for between 60 minutes when the ambient temperature is +10° C. and 15 minutes when the ambient temperature is +32° C.; moving the lid into the open position;
   placing the plurality of vaccine containers into the storage space of the inner container;
   and moving the lid into the closed position.

10. A mobile vaccine carrier with a passive cooling system comprising:
    a housing having a base member and a lid, the lid being hinged to the base member so that the lid is movable by rotation between a closed position and an open position; a vaccine storage member disposed within the housing and defining a storage space for a plurality of vaccine containers; and at least one cooling element disposed within the housing; the vaccine storage member further comprising; an inner container defining the storage space and having an inlet opening for placing and removing the plurality of vaccine containers; a removable vaccine container holder for temporarily storing the plurality of vaccine containers; and a cover member disposed on the lid, the cover member being secured to the lid so that the cover member moves with the lid when the lid is moved by rotation between the closed position and the open position; wherein the vaccine container holder comprises an abutment portion abutting against an outer portion of the inner container so that the inlet opening is covered by the vaccine container holder; and wherein at least a part of the cover member protrudes into the storage space when the lid is in the closed position; wherein the vaccine carrier further comprises a measuring device for monitoring the temperature within the storage space;
    wherein the measuring device has a sensor arrangement comprising a temperature sensor for monitoring the a temperature in the storage space; wherein the sensor arrangement is supported on the cover member:
    wherein the cover member comprises an elongated member integrally formed with the cover member with the temperature sensor being supported on an end portion of the elongated member;
    and wherein the sensor arrangement moves with the cover member when the cover member moves with the lid between the closed position and the open position so that the temperature sensor is disposed within the vaccine storage member when the lid is in the closed position and the temperature sensor being removed from within the vaccine storage member when the lid is in the open position; and wherein the cover member comprises an elongated member integrally formed with the cover member with the temperature sensor being supported on an end portion of the elongated member.

11. The vaccine carrier of claim 10, wherein the vaccine container holder has a central opening, and wherein the temperature sensor is disposed within the central opening when the lid is in the closed position.

12. The vaccine carrier of claim 10, wherein the lid comprises a cooling element storage recess for supporting the at least one cooling element therein, wherein the cover member is articulated to an inner portion of the lid, so that moving the cover member from a first position to a second position allows insertion or removal of the at least one cooling element to or from the cooling element storage recess.

13. The vaccine carrier of claim 10, wherein the vaccine container holder comprises a flexible insert defining at least one support portion, the support portion being configured to receive the plurality of vaccine containers via a force fit.

14. The vaccine carrier of claim 10, wherein the vaccine storage member is supported within the base member, and wherein the base member comprises at least one receptacle for the at least one cooling element.

15. The vaccine carrier of claim 10, comprising at least one of the following features (a) and (b):
  (a) wherein the measuring device comprises a display, wherein the temperature sensor is connected to the display for visualizing the measured temperature;
  (b) wherein the measuring device comprises a photovoltaic cell for power supply.

16. The vaccine carrier of claim 10, wherein the base member comprises first stacking portions and the lid comprises second stacking portions,
  wherein the first stacking portions are configured to engage second stacking portions of a second vaccine carrier so that a plurality of vaccine carriers can be stacked.

17. A mobile carrier with a passive cooling system;
  wherein the carrier for perishable medical products and is configured to maintain the medical products at a stable temperature within a certain temperature range so that the perishable medical products within do not deteriorate;
  wherein the mobile carrier comprises:
  a housing having a base member and a lid, the lid being hinged to the base member so that the lid is movable by rotation between a closed position and an open position;
  a medical products storage member disposed within the housing and defining a storage space for the medical products; and
  at least one cooling element disposed within the housing; the medical products storage member further comprising; an inner container defining the storage space and having an inlet opening for placing and removing medical products; a cover member disposed on the lid, the cover member being secured to the lid so that the cover member moves with the lid when the lid is moved by rotation between the closed position and the open position, and wherein at least a part of the cover member protrudes into the storage space when the lid is in the closed position; wherein the carrier further comprises a measuring device for monitoring the a temperature within the storage space; wherein the measuring device has a sensor arrangement comprising a temperature sensor for monitoring the temperature in the storage space; wherein the sensor arrangement is supported on the cover member; wherein the cover member comprises an elongated member with the temperature sensor being supported on an end portion of the elongated member; and wherein the sensor arrangement moves with the cover member when the cover member moves with the lid between the closed position and the open position so that the temperature sensor is disposed within the vaccine storage member when the lid is in the closed position and the temperature sensor being removed from within the vaccine storage member when the lid is in the open position; and
  wherein the cover member comprises an elongated member with the temperature sensor being supported on an end portion of the elongated member.

18. The mobile carrier of claim 17, wherein the elongated member is integrally formed with the cover member.

19. The mobile carrier of claim 17, wherein the lid comprises a cooling element storage recess for supporting the at least one cooling element therein, wherein the cover member is articulated to an inner portion of the lid, so that moving the cover member from a first position to a second position allows insertion or removal of the at least one cooling element to or from the cooling element storage recess.

20. The vaccine carrier of claim 15, wherein the at least one cooling element disposed within the housing comprises:
  the at least one cooling element provided within the lid of the housing; and
  the at least one cooling element provided within the base member of the housing.

* * * * *